United States Patent
Fukami

[11] Patent Number: 5,975,780
[45] Date of Patent: Nov. 2, 1999

[54] KEYBOARD COVER

[75] Inventor: Hideo Fukami, Tokyo, Japan

[73] Assignee: NEC Corporation, Japan

[21] Appl. No.: 09/175,779

[22] Filed: Oct. 20, 1998

[30] Foreign Application Priority Data

Oct. 20, 1997 [JP] Japan .................................. 9-286967

[51] Int. Cl.⁶ .................................................. B41F 29/13
[52] U.S. Cl. ........................................... 400/691; 400/714
[58] Field of Search ..................................... 400/713, 714, 400/719, 691, 472

[56] References Cited

U.S. PATENT DOCUMENTS

| | | | |
|---|---|---|---|
| 4,546,947 | 10/1985 | Gesten | 400/718 |
| 5,213,427 | 5/1993 | Grosse et al. | 400/625 |
| 5,383,643 | 1/1995 | Koch | 400/714 |
| 5,527,122 | 6/1996 | Carter | 400/496 |
| 5,835,342 | 11/1998 | Hunte | 400/714 |
| 5,845,144 | 12/1998 | Tateyama et al. | 400/719 |

FOREIGN PATENT DOCUMENTS

| | | |
|---|---|---|
| 60-71943 | 5/1985 | Japan . |
| 3132815 | 6/1991 | Japan . |
| 4188214 | 7/1992 | Japan . |
| 61213908 | 9/1992 | Japan . |

*Primary Examiner*—Edgar Burr
*Assistant Examiner*—Amanda B. Sandusky
*Attorney, Agent, or Firm*—Ostrolenk, Faber, Gerb & Soffen, LLP

[57] ABSTRACT

A keyboard cover of the present invention includes a cover holder removably mounted to one side of a keyboard. A flat plate is mounted on the cover holder and selectively rotatable toward the top of the keyboard for covering it or toward the bottom of the keyboard for covering it. A connecting device is rotatably connected to the cover holder at one end and rotatably connected to the plate at the other end for connecting the cover holder and plate. With this configuration, the keyboard cover is capable of selectively playing the role of a cover, a keyboard angle adjusting device or, when the keyboard is not used, a bookrest or a mouse table, as desired.

21 Claims, 5 Drawing Sheets

KEYBOARD COVER

BACKGROUND OF THE INVENTION

The present invention relates to a cover for a keyboard connectable to a data terminal as a data input unit and, more particularly, to a keyboard cover usable as a keyboard angle adjusting device or as, when a keyboard is not operated, a bookrest or a mouse tables, as desired.

A keyboard for a personal computer, work station or similar data terminal occupies a substantial area on a desk or similar base and noticeably effects the efficiency of work to be performed on the table. Particularly, in parallel with the trend toward space saving in, e.g., offices, there is an increasing demand for a decrease in the area to be occupied by the keyboard. By reducing an area to be occupied by the keyboard, it is possible to allocate a greater area to work to be performed in parallel with the input on the keyboard on the same desk and to improve the work environment. The above work includes the manipulation of a mouse and the handling of a book or similar document.

In light of the above, a cover/bookrest is taught in, e.g., Japanese Patent Laid-Open Publication No. 61-213908. The cover/bookrest includes a tray-like cover mounted on one side of the body of, e.g., a personal computer or on a keyboard table. The cover is rotatable about a vertical axis and a horizontal axis perpendicular to the vertical axis. Further, the cover is tiltable relative to a horizontal plane. When a keyboard is not used, the cover is used as a dust cover covering the top of the keyboard. When the keyboard is used, the cover may be used as an upright bookrest for supporting a document.

However, the above cover/bookrest has some problems left unsolved, as follows. The cover/bookrest is no more than a conventional bookrest except that it is mounted to a keyboard so as to play the role of a keyboard cover, as needed, so that it cannot reduce the space to be occupied by a keyboard. Moreover, when the cover/bookrest is used as a bookrest, it is raised away from the keyboard and positioned at, e.g., one side of the keyboard, occupying an additional space. In addition, when the cover/bookrest is used as a cover for covering the keyboard, it cannot be used as a bookrest, i.e., the keyboard occupies a substantial space on a desk even when it is not operated.

Furthermore, a structure for allowing the tray-like cover of the cover/bookrest to rotate about a vertical axis and a horizontal axis and to tilt relative to a horizontal plane is complicated and bulky.

Technologies relating to the present invention are also disclosed in, e.g., Japanese Utility Model Laid-Open Publication No. 60-71943 and Japanese Patent Laid-Open Publication Nos. 3-132815 and 4-188214.

SUMMARY OF THE INVENTION

It is therefore an object of the present invention to provide a keyboard cover selectively usable as a cover or a device for adjusting the angle of a keyboard or, when a keyboard is not used, as a bookrest or a mouse table.

A keyboard cover of the present invention includes a cover holder removably mounted to one side of a keyboard. A flat plate is mounted on the cover holder and selectively rotatable toward the top of the keyboard for covering the top or toward the bottom of the keyboard for covering the bottom. A connecting device is rotatably connected to the cover holder at one end and rotatably connected to the plate at the other end for connecting the cover holder and plate.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
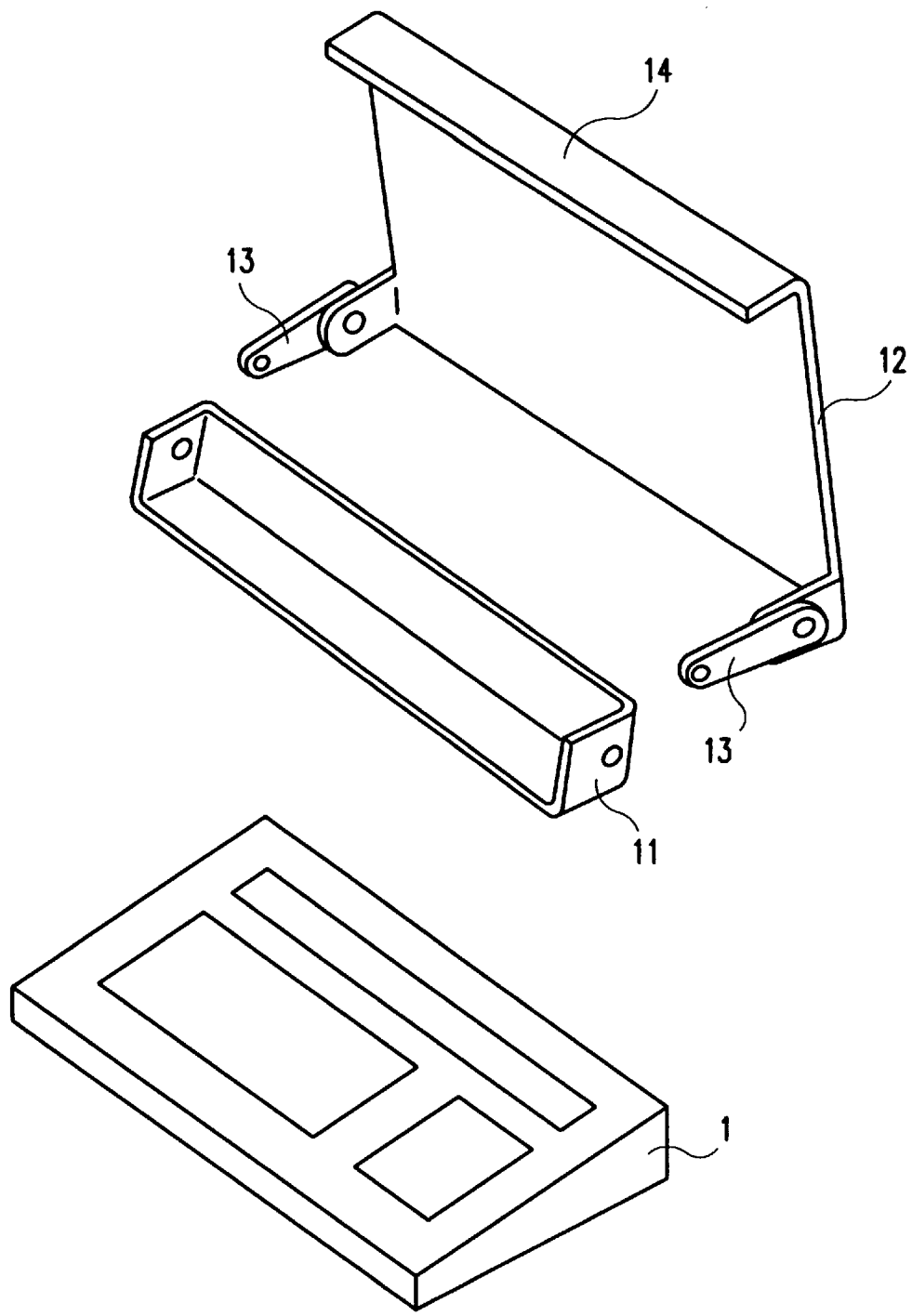
FIG. 1 is a perspective view showing a keyboard cover embodying the present invention in a condition removed from a keyboard.
Figure 2:
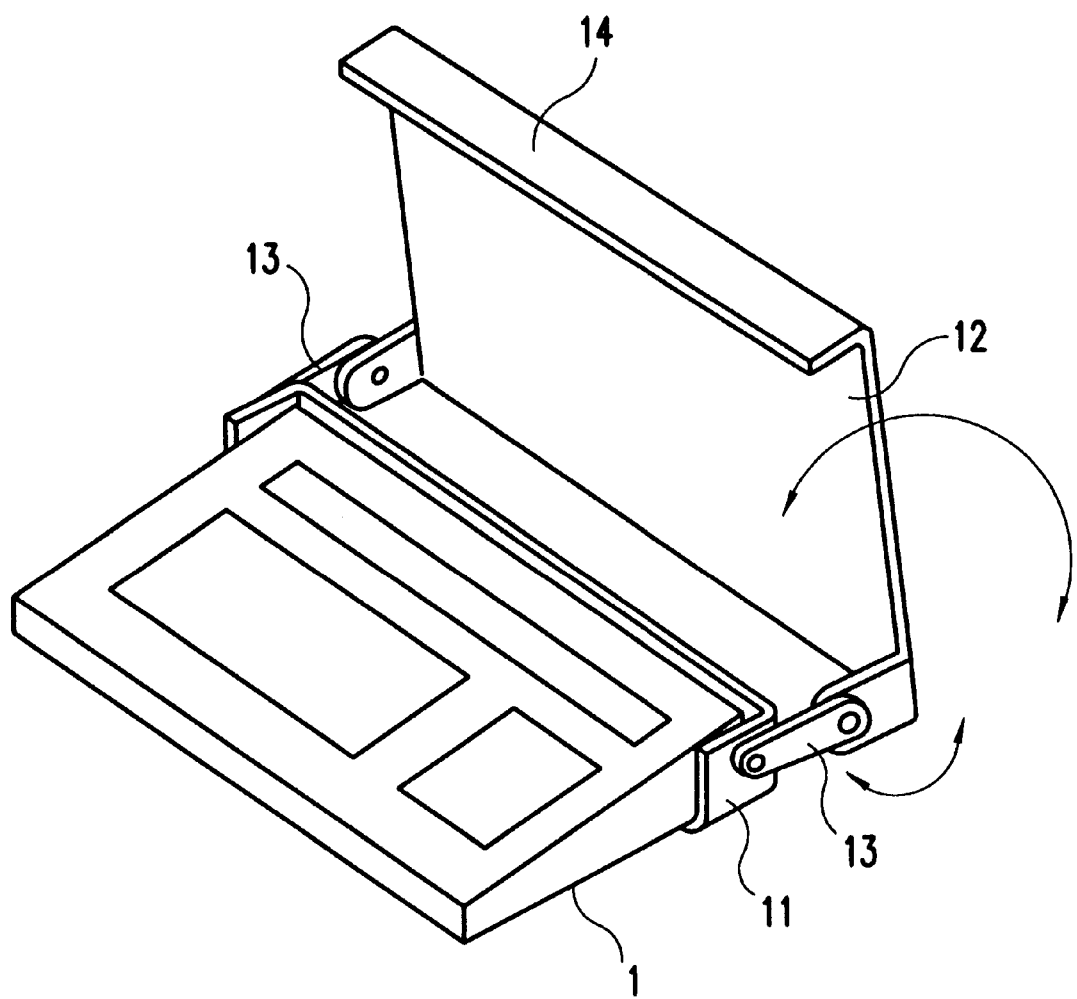
FIG. 2 is a view similar to FIG. 1, showing the keyboard cover in a condition mounted to the keyboard.

Referring to FIGS. 1, 2, 3A, 3B, 4A and 4B, a keyboard cover embodying the present invention is shown. As shown, the keyboard cover includes a cover holder 11 removably mounted to one side of a keyboard 1. In the illustrative embodiment, the cover holder 11 is mounted to the rear longer side of the keyboard 1. Specifically, as shown in FIG. 1, the cover holder 11 is a frame-like member capable of receiving the longer rear side of the keyboard 1. Of course, the cover holder 11 may be mounted to the front longer side or either one of opposite shorter sides of the keyboard 1, depending on the shape and size of the keyboard 1 or the environment in which the keyboard 1 is operated. The keyboard 1 is connected to a personal computer, work station or similar data terminal as a data input unit, although not shown specifically.

A flat plate 12 is mounted to the cover holder 11 at one side thereof and rotatable to cover the top or the bottom of the keyboard 1, as desired. The plate 12 has a slightly greater area than the top or the bottom of the keyboard 1. One of the opposite longer sides of the plate 12 is mounted to the cover holder 11 via a pair of arms 13.

As shown in FIG. 1, the arms 13 each is rotatably connected to one end of the cover holder 11 at one end and rotatably connected to one longitudinal end of the plate 12 at the other end. In this condition, the arms 13 serve as connecting means connecting the cover holder 11 and plate 12. With the arms 13, it is possible to increase the angle over which the plate 12 is rotatable relative to the keyboard 1. The arms 13 and therefore the plate 12 is removable from the cover holder 11, as needed. The plate 12 can therefore be connected to the cover holder 11 upside down such that a spacer 14 always faces the keyboard 1, as will be described specifically later.

In the illustrative embodiment, the arms 13 are removable from the cover holder 11. Alternatively, an arrangement may be made such that the arms 134 are removable from the plate 12 or from both of the cover holder 11 and plate 12.

The plate 12 can be fixed to the cover holder 11 at any desired angle via the arms 13. Specifically, the portions of the arms 13 connected to the cover holder 11 can be fixed at any desired angle by nuts or similar fastening means. This allows the keyboard 1 to be held at a desired angle facilitating its operation or allows the plate 12 to be held at a suitable angle as a bookrest, as needed.

Figure 3A:
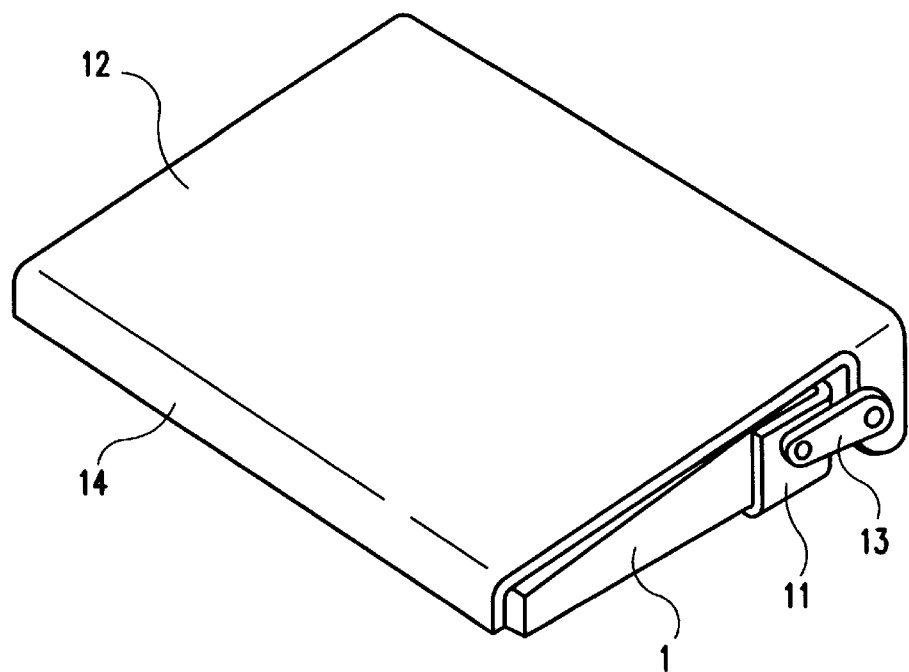
FIG. 3A is a perspective view showing a plate included in the illustrative embodiment and positioned above the top of the keyboard.
Figure 4A:
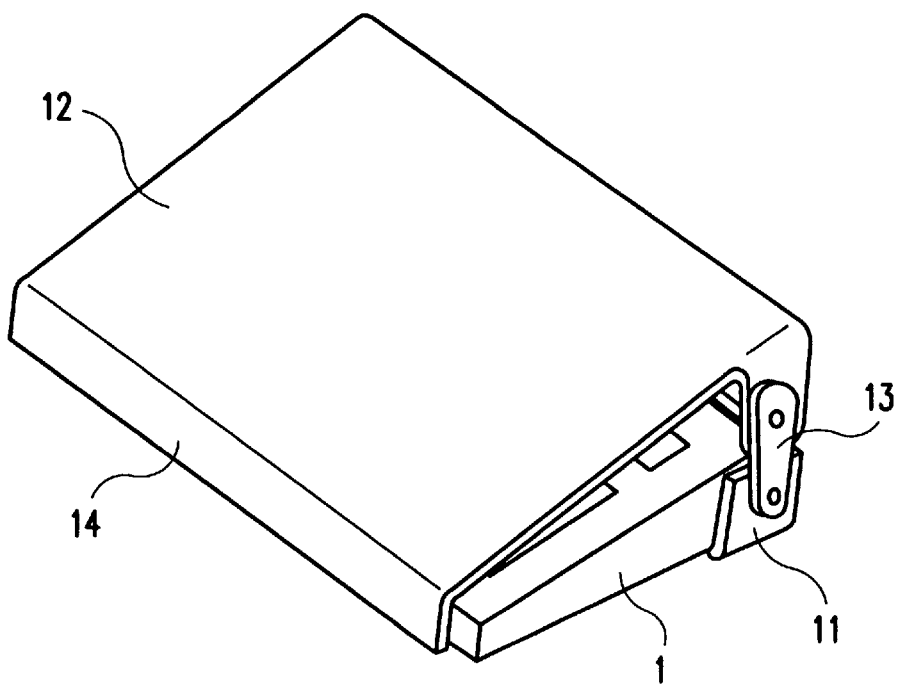
FIGS. 4A and 4B are perspective views respectively corresponding to FIGS. 3A and 3B.

The spacer 14 protrudes from the longer side of the plate 12 opposite to the longer side connected to the cover holder 11. As shown in FIGS. 3A and 4A, when the plate 12 is rotated to the top of the keyboard 1, the spacer 14 spaces the plate 12 by a preselected distance from a desk or similar base on which the keyboard 1 is placed. In this condition, the plate 12 does not contact or press the top of the keyboard 1; otherwise, the plate 12 might scratch or otherwise damage the keyboard 1. In this sense, the spacer 14 should preferably have a height greater than at least the thickness of the keyboard 1.

The height and shape of the spacer 14 may be suitably changed in matching relation to, e.g., the configuration of the keyboard 1 and, when the keyboard 1 is not used, the desired role of the plate 12. The spacer 14 may even be omitted, if desired.

The operation of the above keyboard cover is as follows. As shown in FIG. 3A, when the keyboard 1 is not used, the plate 12 is positioned above the top of the keyboard 1 so as to form a cover. In this flat position, the plate 12 may be used as, e.g., a document tray, a bookrest or, in the case of Internet operation needing only a mouse, a table for manipulating the mouse. Further, as shown in FIG. 4A, the plate 12 can b e positioned at a desired angle facilitating work when used as, e.g., a bookrest or a drawing table.

Figure 3B:
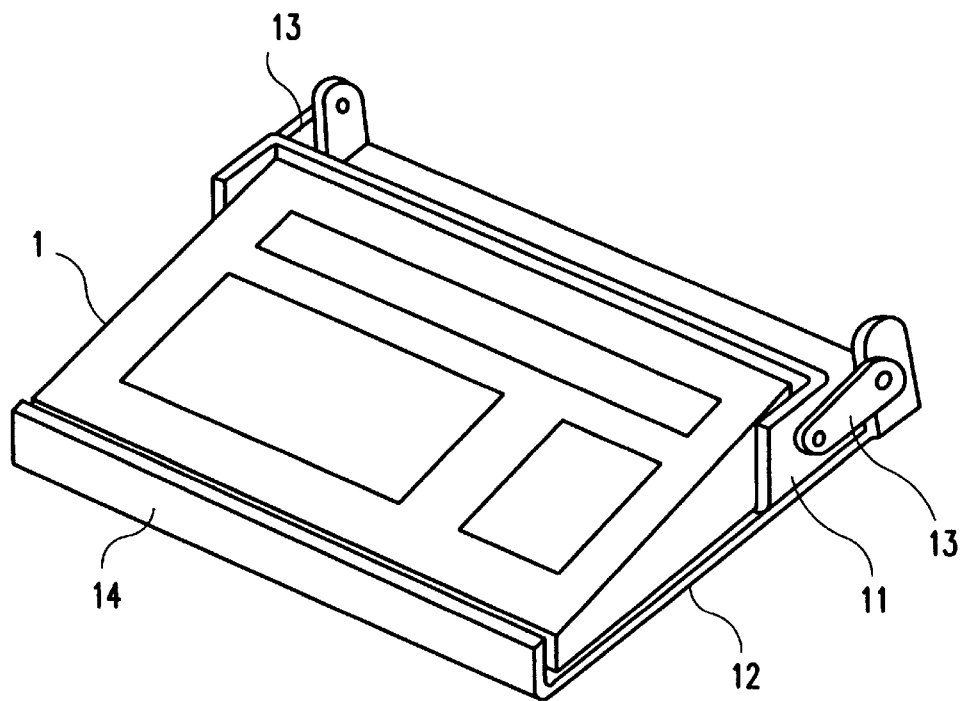
FIG. 3B is a view similar to FIG. 3A, showing the plate positioned below the bottom of the keyboard.
Figure 4B:
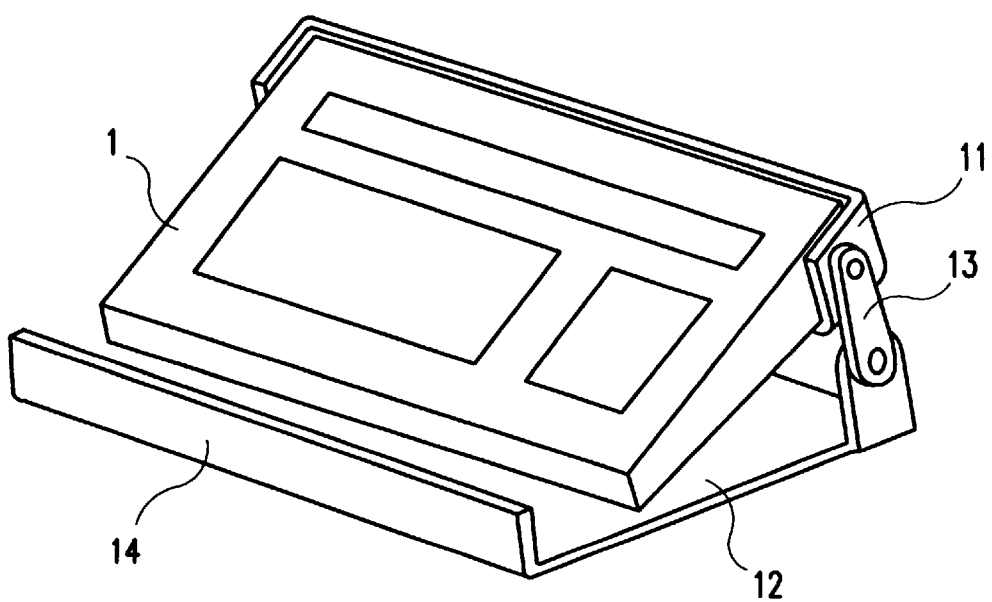

As shown in FIG. 3B, when the keyboard 1 is to be used, the plate 112 is removed from the cover holder 11, turned upside down, again mounted to the cover holder 11, and rotated to the bottom of the keyboard 1. As a result, the top of the keyboard 1 is uncovered and ready to be operated. In this case, the spacer 14 of the plate 12 turned upside down stands upright toward the keyboard 1. Then, as shown in FIG. 4B, the keyboard 13 may be tilted to a desired angle via the arms 13 for facilitating the input of data.

Assume that the spacer 14 does not obstruct data inputting work even when protruding toward the base on which the keyboard 1 is place, or that the spacer 14 is omitted. Then, the operator should only rotate the plate 12 toward the bottom of the keyboard 1 without turning the plate 12 upside down.

As stated above, the plate 12 is mounted to the rear of the keyboard 1 and rotatable toward the top or the bottom of the keyboard 1, as desired. The plate 12 can therefore serve as a cover for the keyboard 1, as a device for adjusting the angular position of the keyboard 1, or as a bookrest or a mouse table when the keyboard 1 is not used, as desired. This promotes the efficient use of the area of a desk or similar base occupied by the keyboard 1.

Figure 5:
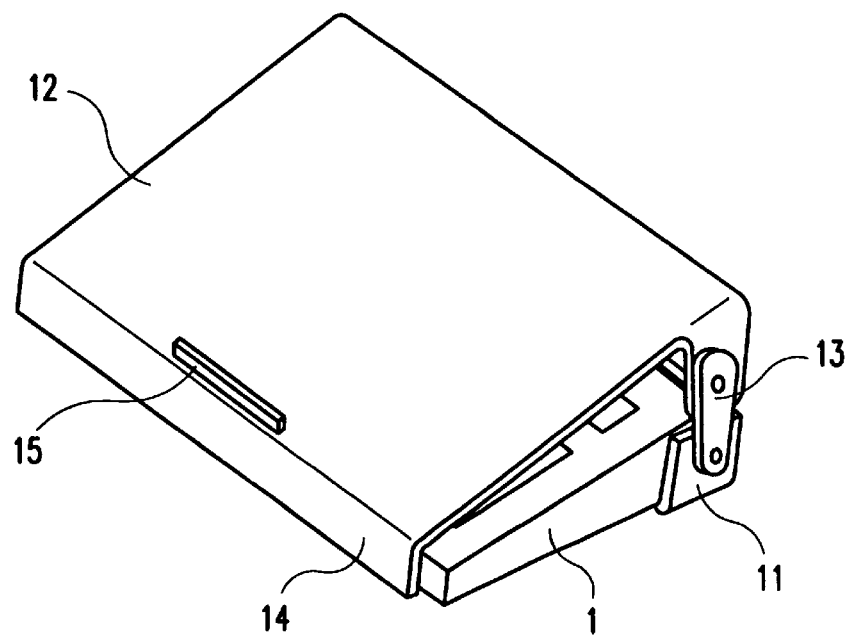
FIG. 5 is a perspective view showing an alternative embodiment of the present invention.

FIG. 5 shows an alternative embodiment of the present invention which is an improved form of the above embodiment. As shown, a stop 15 protrudes from the side of the plate 12 opposite to the side where the plate 12 is connected to the cover holder 11. The stop 15 extends away from the keyboard 1 when the plate 12 is positioned above the top of the keyboard 1. In this embodiment, when the plate 12 is used as a bookrest, the stop 15 stops a book or similar document put on the plate 12. Therefore, even when the plate 12 is tilted, the document is prevented from slipping down from the plate 12. Consequently, the plate 12 forms a bookrest easier to use.

Figure 6:
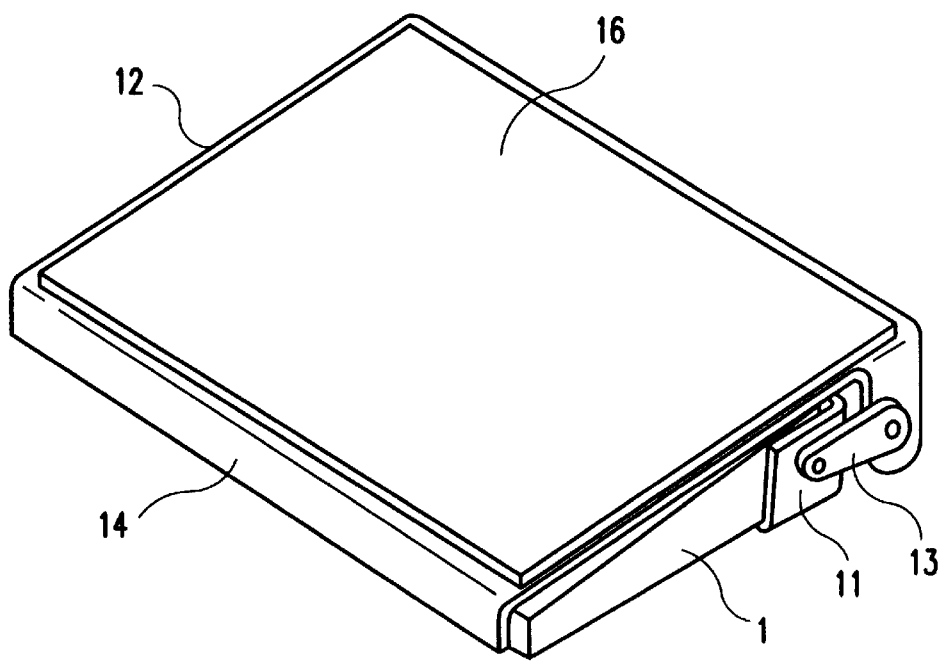
FIG. 6 is a perspective view showing another alternative embodiment of the present invention.

Another alternative embodiment of the present invention which also constitutes an improvement over the first embodiment is shown in FIG. 6. As shown, an elastic member 16 is fitted on the surface of the plate 12. When the plate 12 is used as a mouse table, the elastic member 16 forms a mouse pad and further facilitates the operation of a mouse.

In summary, it will be seen that the present invention provides a keyboard cover capable of selectively playing the role of a cover or the role of a keyboard angle adjusting device, a bookrest or a mouse table, as desired.

Various modifications will become possible for those skilled in the art after receiving the teachings of the present disclosure without departing from the scope thereof.

What is claimed is:

1. A keyboard cover comprising:
   a cover holder removably mounted on a side of a keyboard;
   a flat plate mounted on said cover holder and selectively rotatable toward a top of the keyboard for covering the top and toward a bottom of the keyboard for covering the bottom; and
   connecting means pivotably connected to said cover holder at one end and pivotably connected to said plate at the other end for connecting said cover holder and said plate such that said flat plate is selectively rotatable for covering the top and the bottom of the keyboard.

2. A keyboard cover as claimed in claim 1, wherein said connecting means comprises a pair of arms each being rotatably connected to said cover holder at one end and rotatably connected to said plate at the other end.

3. A keyboard cover as claimed in claim 2, wherein said connecting means is removably mounted on at least one of said cover holder and said plate.

4. A keyboard cover as claimed in claim 3, wherein said connecting means is capable of being fixed at any desired angle relative to said cover holder.

5. A keyboard cover as claimed in claim 4, further comprising a spacer protruding from a side of said plate opposite to a side connected to said cover holder such that said spacer extends toward the keyboard when said plate is positioned above the top of the keyboard.

6. A keyboard cover as claimed in claim 5, further comprising a stop protruding from the side of said plate opposite to the side connected to said cover holder such that said stop extends away from the keyboard when said plate is positioned above the top of the keyboard.

7. A keyboard cover as claimed in claim 6, further comprising an elastic member fitted on a surface of said plate.

8. A keyboard cover as claimed in claim 2, wherein said connecting means is capable of being fixed at any desired angle relative to said cover holder.

9. A keyboard cover as claimed in claim 2, further comprising a spacer protruding from a side of said plate opposite to a side connected to said cover holder such that said spacer extends toward the keyboard when said plate is positioned above the top of the keyboard.

10. A keyboard cover as claimed in claim 2, further comprising a stop protruding from the side of said plate opposite to the side connected to said cover holder such that said stop extends away from the keyboard when said plate is positioned above the top of the keyboard.

11. A keyboard cover as claimed in claim 2, further comprising an elastic member fitted on a surface of said plate.

12. A keyboard cover as claimed in claim 3, wherein said connecting means is capable of being fixed at any desired angle relative to said cover holder.

13. A keyboard cover as claimed in claim 3, further comprising a spacer protruding from a side of said plate opposite to a side connected to said cover holder such that said spacer extends toward the keyboard when said plate is positioned above the top of the keyboard.

14. A keyboard cover as claimed in claim 3, further comprising a stop protruding from the side of said plate opposite to the side connected to said cover holder such that said stop extends away from the keyboard when said plate is positioned above the top of the keyboard.

15. A keyboard cover as claimed in claim 3, further comprising an elastic member fitted on a surface of said plate.

16. A keyboard cover as claimed in claim 4, further comprising a spacer protruding from a side of said plate opposite to a side connected to said cover holder such that said spacer extends toward the keyboard when said plate is positioned above the top of the keyboard.

17. A keyboard cover as claimed in claim 4, further comprising a stop protruding from the side of said plate opposite to the side connected to said cover holder such that said stop extends away from the keyboard when said plate is positioned above the top of the keyboard.

18. A keyboard cover as claimed in claim 4, further comprising an elastic member fitted on a surface of said plate.

19. A keyboard cover as claimed in claim 5, further comprising a stop protruding from the side of said plate opposite to the side connected to said cover holder such that said stop extends away from the keyboard when said plate is positioned above the top of the keyboard.

20. A keyboard cover as claimed in claim 5, further comprising an elastic member fitted on a surface of said plate.

21. A keyboard cover as claimed in claim 1, wherein the cover holder comprises a frame for receiving the side of the keyboard.

\* \* \* \* \*